(12) United States Patent
Preston (10) Patent No.: US 6,900,565 B2
(45) Date of Patent: May 31, 2005

(54) EXPLOSION-PROOF MOTOR CONTROLLER APPARATUS

(75) Inventor: Joel Preston, Corona, CA (US)

(73) Assignee: Airex Corporation, Anaheim, CA (US)

( * ) Notice: Subject to any disclaimer, the term of this patent is extended or adjusted under 35 U.S.C. 154(b) by 0 days.

(21) Appl. No.: 10/637,252

(22) Filed: Aug. 8, 2003

(65) Prior Publication Data

US 2005/0029881 A1 Feb. 10, 2005

(51) Int. Cl.$^7$ .............................................. H02K 5/10
(52) U.S. Cl. .......................................... 310/88; 310/89
(58) Field of Search .............................. 310/88–89, 43, 310/68 R, 71; 702/188; 173/114

(56) References Cited

U.S. PATENT DOCUMENTS

| | | | |
|---|---|---|---|
| 6,037,857 | A | 3/2000 | Behrens et al. |
| 6,154,679 | A | 11/2000 | Kessler et al. |
| 6,392,322 | B1 | 5/2002 | Mares et al. |
| 6,422,532 | B1 | 7/2002 | Garner |
| 2002/0002426 | A1 | 1/2002 | Burkhard |
| 2003/0019644 | A1 * | 1/2003 | Richter et al. .............. 173/114 |
| 2004/0102929 | A1 * | 5/2004 | Evans ......................... 702/188 |

* cited by examiner

Primary Examiner—Thanh Lam
(74) Attorney, Agent, or Firm—Michael A. Shippey; Law Offices of Karla Shippey (57) ABSTRACT

The present invention is a electronic motor control apparatus designed for use in hazardous/classified environments, such as described in Article 500, Section 500.7 of the NFPA 70/National Electrical Code. The invention comprises a third party approved (i.e., UL Listed, UL Classified, CSA Certified, FM Approved, CE Approved) explosion-proof outer shell of aluminum, an interior controller, and a plurality of conductive plates to carry heat away from the interior controller to the external shell and environment. The controller may be an inverter or a solid-state device, and may be capable of variable frequency and voltage output. Interior and/or exterior cooling devices, such as fans, may be attached or adjacent to the apparatus to assist in heat dispersal. Interior air circulating booster fans may be installed inside the apparatus to increase internal air film coefficient, thus providing a maximized heat dissipative atmosphere. Exterior cooling devices rated to the area may be used to assist with maintaining the external air film coefficient and/or maximizing the thermal capabilities of the environment surrounding subject enclosure.

30 Claims, 6 Drawing Sheets

Fig. 3  BOTTOM VIEW

EXPLOSION-PROOF MOTOR CONTROLLER APPARATUS

BACKGROUND OF THE INVENTION

This invention relates generally to the field of electric motor controllers. More specifically, this invention is directed to electronic motor control assemblies having explosion-proof construction that facilitates use in explosive or combustible gas, liquid, or dust environments. Such hazardous environments are defined as hazardous/classified areas in the National Fire Protection Association (NFPA) 70, further defined in the National Electrical Code (NEC) Section 500, Class 1, Divisions 1 and 2, and Class 2, Divisions 1 and 2. Explosion-proof service is defined in NEC Section 500.7. The use of the term "hazardous/classified" shall be understood to refer to this type of environment throughout this document.

BACKGROUND OF THE INVENTION

The construction and utilization of electronic motor controls is well understood. For example, electronic motor controls have included variable frequency controllers and solid-state motor controllers (SoftStarts). For various reasons discussed below, none of the prior art electronic motor controls are suitable for use in applications where there is a hazardous/classified environment, and where there is a need for speed control or reduced voltage starting in a limited package space. For example, none of the prior art devices are suitable for the control of a motor in an oil refinery tank farm that requires speed control within a hazardous/classified environment. It is believed that other similar applications exist where there is a need for a limited package space motor speed control or reduced voltage starting that can operate within a hazardous/classified environment.

Electro-mechanical hazardous location motor starters are well known in the art. Typically an electric motor is started by an electromechanical motor starter. The electromechanical contactor closes a set of contacts to allow the motor to run. However, the ability to precisely control motor speed or reduced voltage motor starting is not available by this method. Across the line starting of motors has a higher current draw and on some larger motors may exceed the current limits set by the power utility.

Solid-state controllers (SoftStarts) and variable frequency controllers are able to closely control voltage applied to the motor, thus reducing the current used. However, electronic motor controls are known to produce large amounts of heat, which can be hazardous when used within a hazardous/classified environment. The means to dissipate the large amount of heat produced by these controllers has been an issue.

Large, purged enclosures have been utilized for this purpose, with the addition of purging equipment and at times air conditioning. This method has proved expensive as well as bulky which tends prevent use where space is limited. The Purge System format (even when applied per NFPA 496) has a potential for an explosion and loss of life. No system has been developed, prior to the current invention, to prevent the potential for catastrophic failure due to system failure. The Purge System also is not capable of containing an explosion. It was this safety issue that was a major driving factor for the current invention.

Another option has been to place the solid-state controller outside the hazardous/classified area. This option can also be a costly alternative since the increased distance from the solid state controller to the motor can require heavier cables and possibly a larger solid state controller.

Accordingly there exists a need for an electronic motor controller that is compact and suitable for use in hazardous/classified environments, such as for the control of a motor in an oil refinery tank farm.

DESCRIPTION OF THE RELATED ART

U.S. Pat. No. 6,392,322 to Mares et al (assigned to Precision Engine Controls of San Diego) is possibly the closest prior art in this regard. They describe an explosion-proof actuator assembly.

U.S. Pat. No. 6,154,679 to Kessler et al (assigned to Rockwell Technologies) describes a bus isolator for an industrial control system in hazardous/classified environments. They rely on low-voltage logic circuitry.

U.S. Pat. No. 6,037,857 to Behrens et al (assigned to Allen-Bradley of Milwaukee) describes another an industrial control system in hazardous/classified environments. They also rely on low-voltage logic circuitry.

The Kessler '679 and Behrens '857 patents get around the issue of potential sparking or localized heating by separating the control circuit from the startup line circuit. Thus, they do not fully address the problem of startup and control of large motors, for pumps, blowers, and other equipment, that are located in hazardous/classified environments.

It is possible, and indeed frequent practice, to locate motor controllers in locations remote from the motors being controlled. In this way, the motor controllers do not have to meet explosion-proof requirements.

However, remote location of the controller requires an expensive installation process. Many sites are small, or for other reasons do not possess suitable remote locations. Response time is faster, and upkeep less costly, for onsite controllers.

Thus, there is a need in the industry for an explosion-proof electronic motor controller or controller assembly capable of high power output, variable voltage or frequency output, and soft startups of motors in hazardous/classified environments.

SUMMARY OF THE INVENTION

The present invention is an electronic motor control apparatus designed for use in hazardous/classified environments, such as described in Article 500, Section 500.7 of the NFPA 70/National Electrical Code. The invention comprises an explosion-proof outer shell of aluminum, an interior controller, and a plurality of conductive plates to carry heat away from the interior controller to the external shell and environment. The controller may be an inverter or a solid-state device, and may be capable of variable frequency and voltage output. Interior and/or exterior air circulating devices, such as fans, may be attached or adjacent to the apparatus to assist in cooling and heat dispersal. Environment air conditioning may also be utilized. Interior fans may consist of booster fans mounted to the interior of the apparatus. Exterior cooling and air circulating devices must themselves be rated for service in the intended environment.

The primary object of the invention is to provide safe motor startup and control in a hazardous/classified or combustible environment.

Another object of the invention is to provide a controller capable of producing high power output in a hazardous/classified or combustible environment.

Another object of the invention is to provide a controller capable of variable voltage output in a hazardous/classified or combustible environment.

Another object of the invention is to provide a controller capable of variable frequency output in a hazardous/classified or combustible environment.

Another object of the invention is to provide a controller capable of control of acceleration and torque in a motor or motors in a hazardous/classified or combustible environment.

Another object of the invention is to provide a method for temperature control of greater precision than found in conventional motor controllers.

Another object of the invention is using an air supply to direct a steady air stream over the explosion-proof controller to maintain uniform heat temperature. The air blower will provide an evenly distributed air throughout the operation.

Another object of the invention is to provide a process for operation of a controller apparatus in a hazardous/classified or combustible environment.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as representative basis for teaching one skilled in the art to employ the present invention in virtually any appropriately detailed system, structure or manner.

Figure 1:
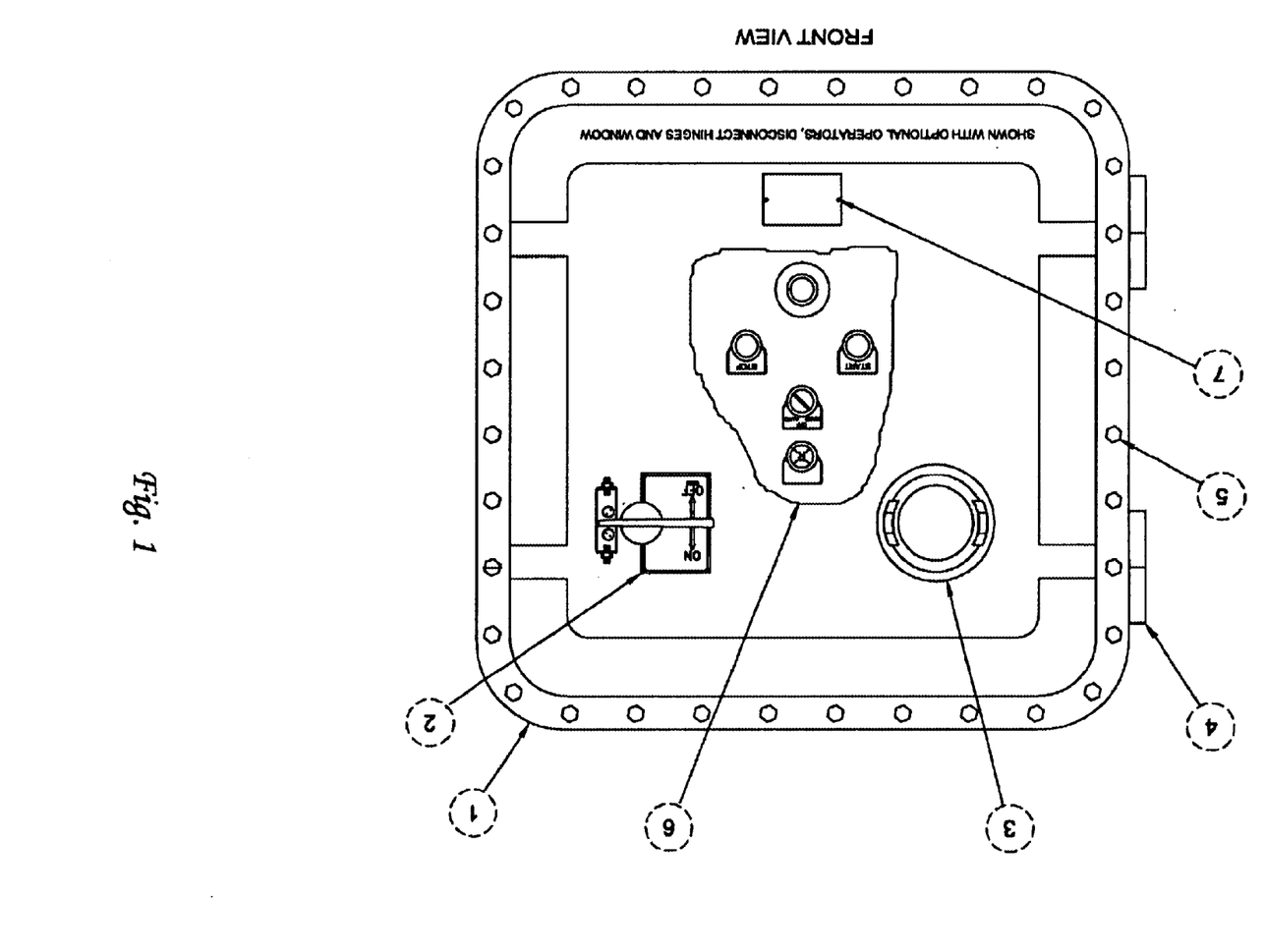
FIG. 1 is a frontal view of the present invention with the door shut.

Referring now to FIG. 1 we see the front door panel of the present invention. This embodiment has an outer shell 1, a viewing window 3 for viewing the interior from outside, with the door closed. The front panel also includes door hinges 4, a handle 2 for power disconnection, and various control dials 6 for manual override of the motor controller, located inside the outer shell. Lug nuts 5 secure the front door to the shell 1.

Figure 2:
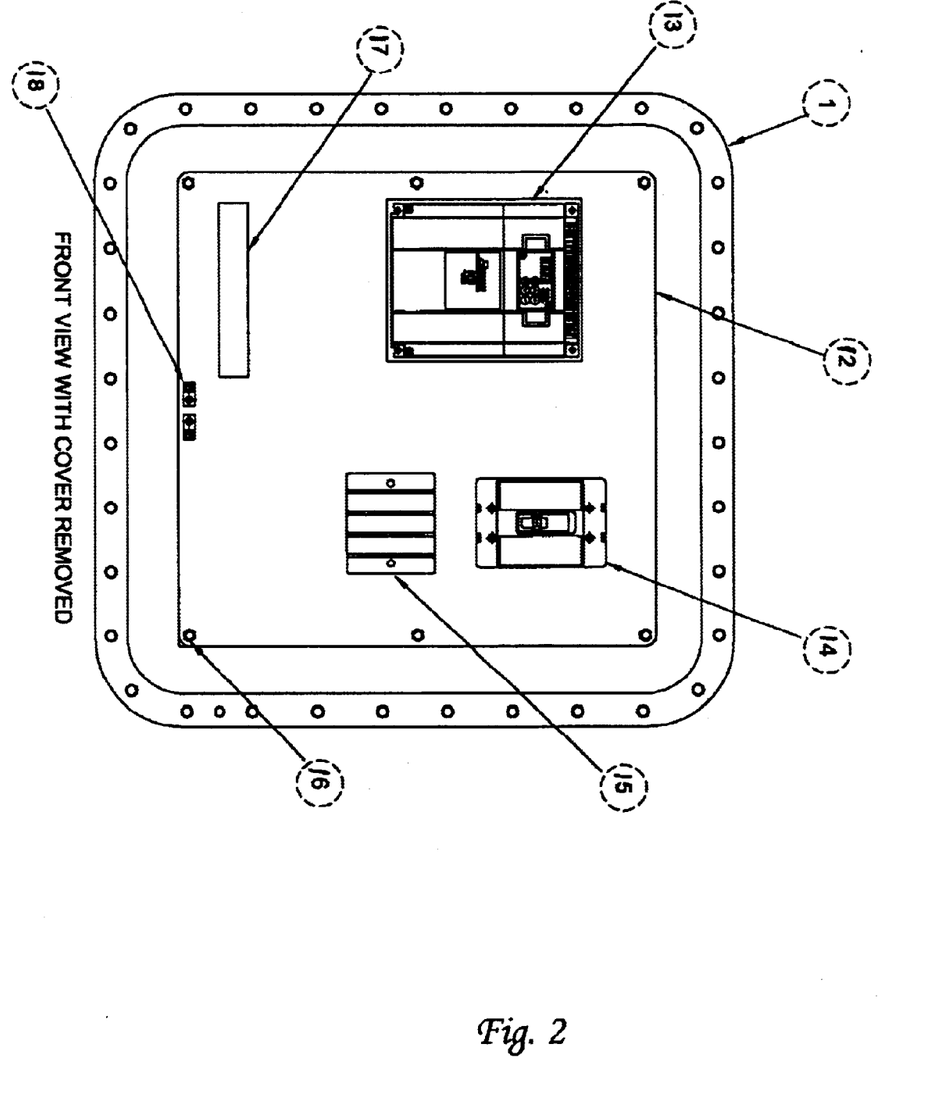
FIG. 2 is a view of the interior of an embodiment of the present invention, with the door removed.
Figure 3:
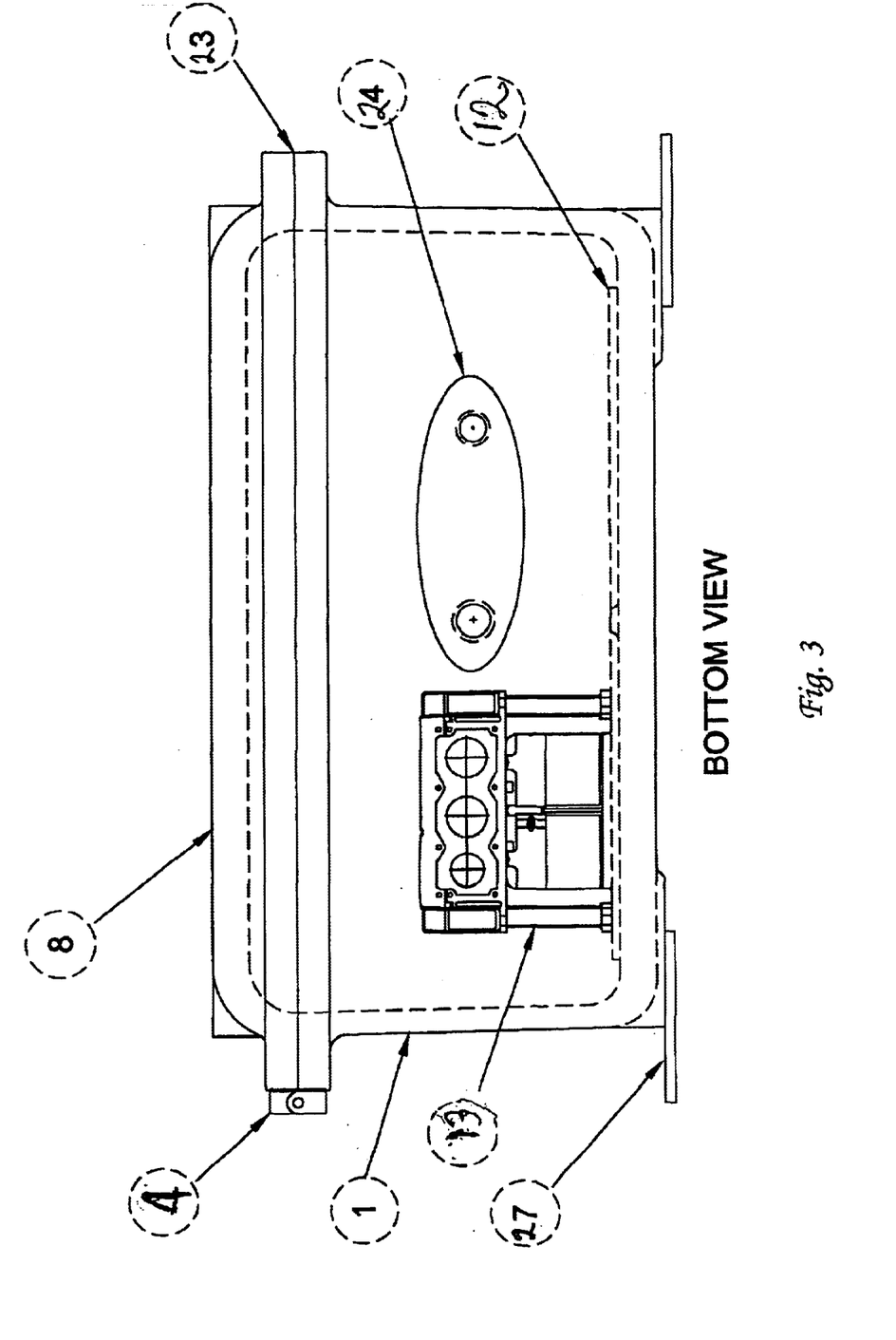
FIG. 3 is a cutaway bottom view of an embodiment of the present invention.

FIG. 2 shows the same embodiment with the front door removed. The motor controller 13 is seen, above an optional interior circulating fan 17. Note that there is room within the enclosure 1 for additional fans, or motor controllers, if desired. A circuit, or power disconnect 14 is displayed, as is optional fusing 15. A solid aluminum back subpanel 12 is illustrated, attached to the back panel with nuts or screws 16. Grounding lugs 18 are also displayed.

The solid aluminum panel is critical to the operation of the present invention. It allows heat to be conducted rapidly away from the source motor controller, while not compromising the explosion-proof nature of the outer shell. The aluminum panel may be connected to the shell by lugs as shown, or screws, or other means. Indeed, the panel may simply be held by friction or compression between the motor controller and the interior back wall of the shell. It is important not to leave any air gap between plate and wall surface.

There may be a multitude of solid aluminum plates, adjacent to each other, between the controller and the interior back wall of the shell. There may also be additional solid aluminum plates immediately outside the back wall, adjacent thereto. It is again important not to leave any air gap between plates.

In order to maximize thermal transfer, a thermally conductive paste or grease may be placed between the solid aluminum plates, and between plates and the wall of the shell. This further reduces any air gap and increases thermal conductivity.

It is further advantageous to operate a circulating booster fan within the shell of the present invention, although this is not always necessary. A plurality of circulating fans can be introduced to the interior of the invention to further enhance uniformity of temperature distribution.

In testing with this embodiment, reductions in maximum temperature rise of 30% or more have been seen, compared to standard controller assemblies lacking the solid aluminum plates. Controllers approaching 100 hp output (600 volts max) can be comfortably operated in hazardous/classified environments with this invention. The output can be increased through the use of SoftStarters rather than inverter controllers.

To achieve yet more power output in hazardous environments, external cooling sources can be employed. This could take the form of air circulation around the apparatus, or air conditioning of the environment of the apparatus. However, the external cooling source must itself meet explosion-proof limits (as listed above in the NEC). Thus, a less expensive external cooling source is an external fan or blower circulating air around the exterior of the shell of the present invention. However, air conditioning will allow higher hp output controllers to be used in the invention.

Using a preferred embodiment of the present invention, with external air blower, the present invention has produced satisfactory temperature rise at 450 hp output at 600 volts max. This is far in excess of existing motor controllers. The output can be increased through the use of SoftStarters rather than inverter controllers.

The present invention is thus capable of providing both line and control voltage to a motor, or multiple motors, in a hazardous/classified or combustible environment.

TABLE I

| Company Name | Category Name | Link to File |
|---|---|---|
| AIREX CORP | Control Panels and Assemblies for Use in Hazardous Locations | NNNY.E226569 |
| AIREX CORP | Control Panels and Assemblies for Use in Hazardous Locations Certified for Canada | NNNY7.E226569 |
| AIREX CORP | Filter Units; Air | AJZV.R8421 |
| AIREX CORP | Flame Control Panels | NIVT.E220538 |
| AIREX CORP | Flame Control Panels Certified for Canada | NIVT7.E220538 |
| AIREX CORP | Industrial Control Panels | NITW.E220474 |
| AIREX CORP | Industrial Control Panels Certified for Canada | NITW7.E220474 |
| AIREX CORP | Industrial Control Panels Relating to Hazardous Locations | NRBX.E231360 |
| AIREX CORP | Industrial Control Panels Relating to Hazardous Locations Certified for Canada | NRBX7.E231360 |

Figure 4:
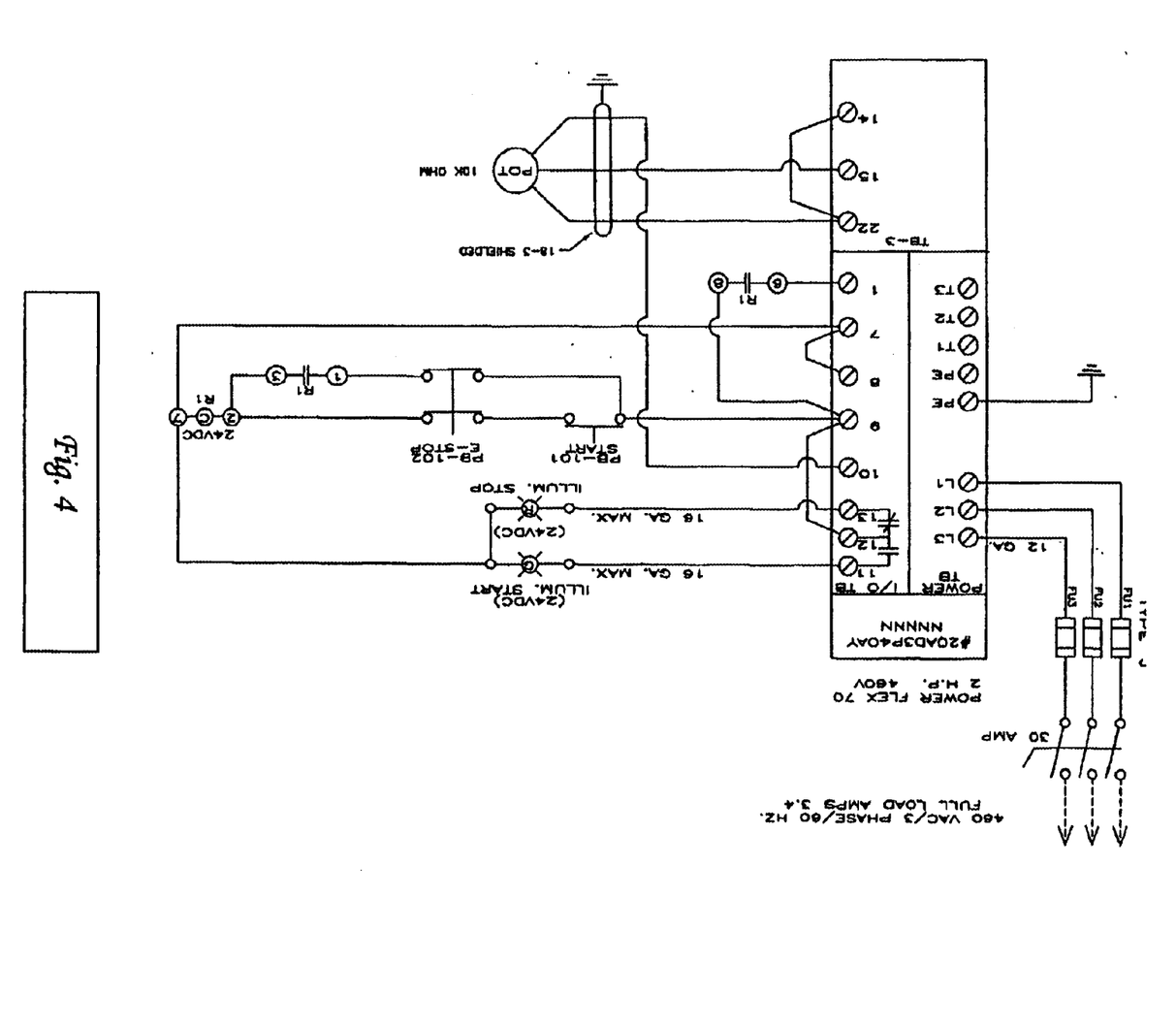
FIG. 4 portrays an electrical wiring diagram of an embodiment of the present invention.

FIG. 4 illustrates a wiring diagram for an embodiment of the present invention.

Figure 5:
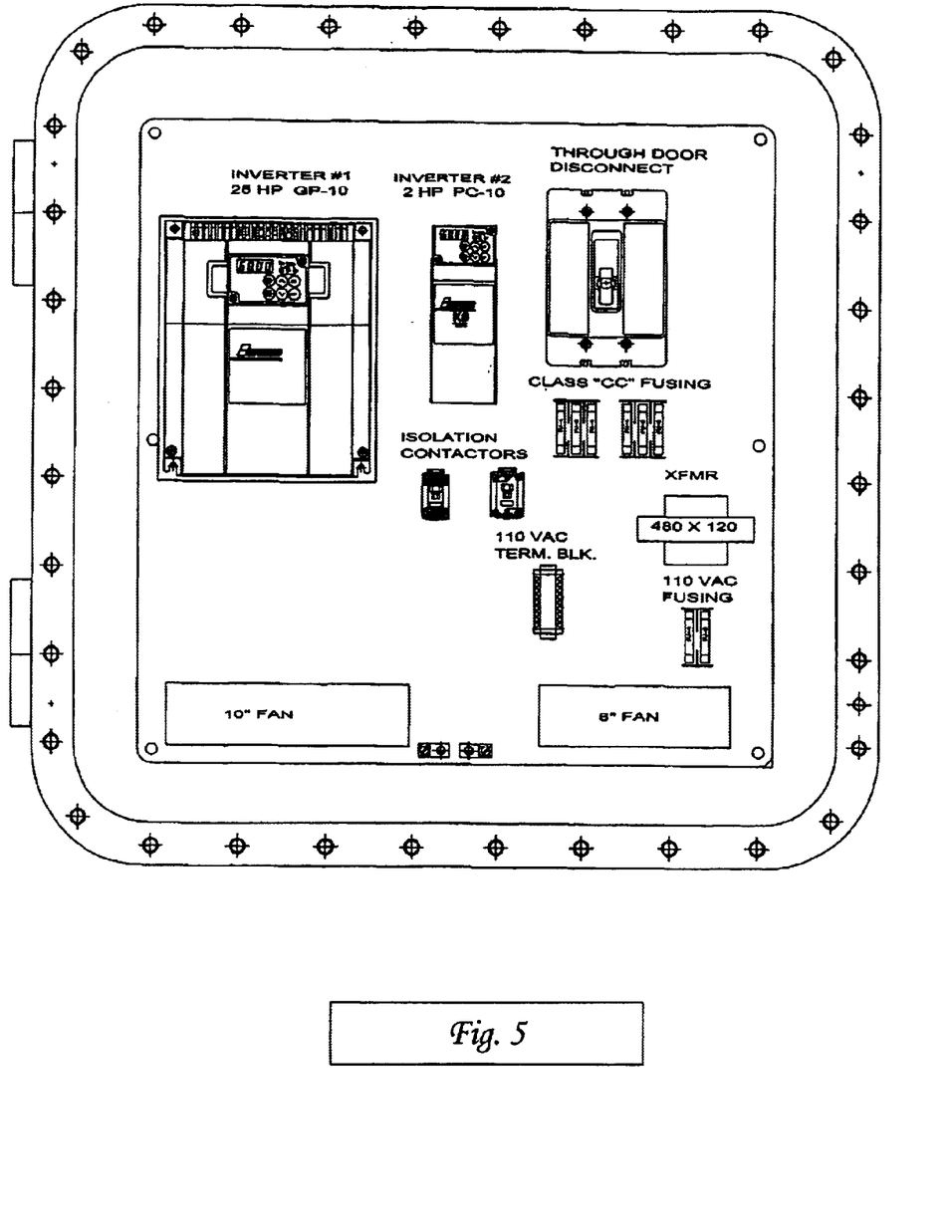
FIG. 5 is a view of the interior of another embodiment of the present invention, with multiple motor controllers and circulating fans.

FIG. 5 illustrates a view of the interior of an alternate embodiment of the present invention. This embodiment includes two separate controllers and two circulating fans. It is thus apparent that this invention could control a multitude of motors by means of adding motor controllers, and perhaps additional cooling capability through additional aluminum plates, or external cooling means.

Figure 6:
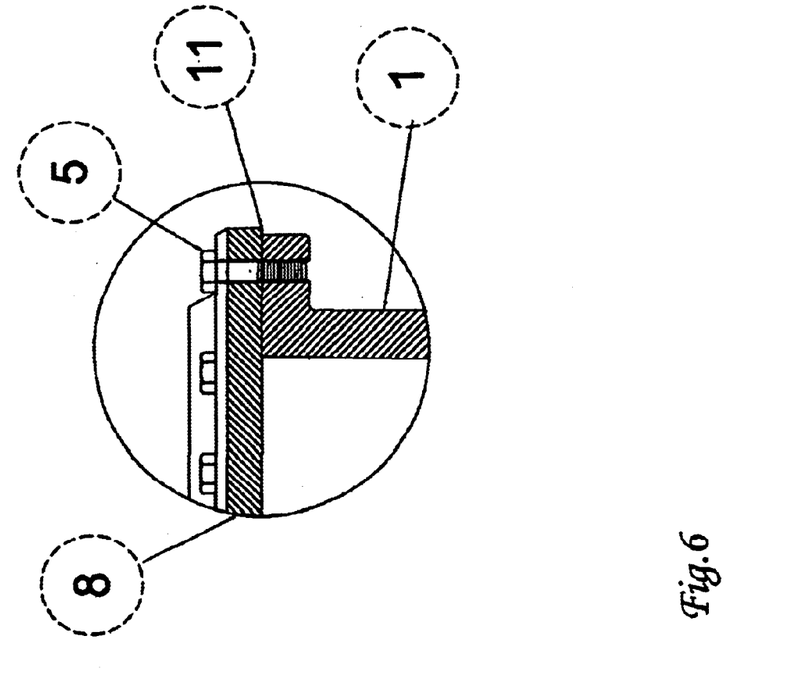
FIG. 6 portrays the detail of the shell of an embodiment of the present invention.

FIG. 6 illustrates detail of the shell of the present invention. Through the wall of the shell 1 is a conduit 11, through which a flame path could follow. In explosion-proof apparatus, flame paths are closely controlled and limited to the extent possible.

In the lower view of FIG. 6 is shown an alternative flame path 11. This occurs at the interface between the shell body 1 and the cover 8. Yet another flame path, not shown, occurs along the interface and up the hole of a lug nut, screw, or bolt 5.

While the invention has been described in connection with a preferred embodiment or embodiments, it is not intended to limit the scope of the invention to the particular form set forth, but on the contrary, it is intended to cover such alternatives, modifications, and equivalents as may be included within the spirit and scope of the invention as defined by the appended claims.

I claim:

1. An explosion-proof electronic motor controller apparatus comprising:
    an explosion-proof shell comprised of heat-conductive material;
    an electronic motor controller for external motor control;
    means for fast heat conduction attached or immediately adjacent to and connecting said controller to said shell, said heat conduction means comprising means for direct conduction of heat form the interior to the surface of said shell, and further comprising radiative dissipation of heat at said surface; and
    means for conducting electrical signals from said controller to an external motor.

2. The apparatus of claim 1 wherein said shell is comprised substantially of aluminum.

3. The apparatus of claim 1 wherein said means for fast heat conduction is comprised substantially of a plurality of solid aluminum plates.

4. The apparatus of claim 3 wherein said shell has a thermal conductivity of at least equal to the thermal conductivity of 5200 series aluminum.

5. The apparatus of claim 3 wherein each said aluminum plate has a thermal conductivity of at least equal to the thermal conductivity of 5200 series aluminum.

6. The apparatus of claim 1 wherein said controller is capable of variable frequency or variable voltage output.

7. The apparatus of claim 1 wherein said controller is capable of soft startups.

8. The apparatus of claim 1 wherein a plurality of circulating fans is mounted inside said shell, and used for the distribution of air within said shell.

9. The apparatus of claim 1 wherein said controller reaches less than 100 degrees Centigrade at its hottest point during normal operation.

10. The apparatus of claim 1 wherein said controller is capable of safe operation in an atmosphere of potential or actual explosive composition.

11. The apparatus of claim 1 wherein said controller is capable of safe operation in a Class 1, Division 1 or 2 location as defined by NFPA 70/(National Electrical Code).

12. The apparatus of claim 1 wherein said controller is compatible with Article 500, Section 500.7 of the NFPA 70/National Electrical Code (2002 edition).

13. The apparatus of claim 1 wherein said controller is an inverter.

14. An explosion-proof electronic motor controller apparatus comprising:
    an explosion-proof shell comprised of heat-conductive material;
    an electronic motor controller for external motor control;
    means for direct conduction of heat from the interior to the surface of said shell;
    external means for cooling said shell;
    means for fast heat conduction attached or immediately adjacent to and connecting said controller to said shell; and
    means for conducting electrical signals from said controller to an external motor.

15. The apparatus of claim 14 wherein an external forced air supply is used to cool said shell by means of blowing air continuously around said shell.

16. The apparatus of claim 14 wherein said external means for cooling comprises air conditioning.

17. The apparatus of claim 14 wherein said shell is comprised substantially of aluminum.

18. The apparatus of claim 14 wherein said means for fast heat conduction is comprised substantially of a plurality of solid aluminum plates.

19. The apparatus of claim 17 wherein said shell has a thermal conductivity of at least equal to the thermal conductivity of 5200 series aluminum.

20. The apparatus of claim 14 wherein said controller is capable of variable voltage output.

21. The apparatus of claim 14 wherein said controller is capable of variable frequency output.

22. The apparatus of claim 14 wherein said controller is capable of soft startups.

23. The apparatus of claim 14 wherein a plurality of circulating fans is mounted inside said shell, and used for the distribution of air within said shell.

24. The apparatus of claim 14 wherein said controller reaches less than 100 degrees Centigrade at its hottest point during normal operation.

25. The apparatus of claim 14 wherein said controller is capable of safe operation in an atmosphere of potential or actual explosive composition.

26. The apparatus of claim 14 wherein said controller is capable of safe operation in a Class 1, Division 1 or 2 location as defined by NFPA 70/(National Electrical Code).

27. The apparatus of claim 14 wherein said controller is compatible with Article 500, Section 500.7 of the NFPA 70/National Electrical Code (2002 edition).

28. The apparatus of claim 14 wherein said controller is an inverter.

29. The process of controlling a motor in a potentially combustible or explosive location, using the motor controller apparatus of claim 1.

30. The process of controlling a motor in a potentially combustible or explosive location, using the motor controller apparatus of claim 14.

* * * * *